(12) United States Patent
Raksha et al.

(10) Patent No.: US 7,876,481 B2
(45) Date of Patent: Jan. 25, 2011

(54) PATTERNED OPTICAL STRUCTURES WITH ENHANCED SECURITY FEATURE

(75) Inventors: Vladimir P. Raksha, Santa Rosa, CA (US); Roger W. Phillips, Santa Rosa, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 794 days.

(21) Appl. No.: 11/552,219

(22) Filed: Oct. 24, 2006

(65) Prior Publication Data

US 2007/0058227 A1  Mar. 15, 2007

Related U.S. Application Data

(60) Continuation-in-part of application No. 11/273,985, filed on Nov. 15, 2005, which is a continuation-in-part of application No. 10/666,318, filed on Sep. 18, 2003, now Pat. No. 6,987,590, application No. 11/552,219, which is a continuation-in-part of application No. 11/313,165, filed on Dec. 20, 2005, which is a continuation-in-part of application No. 11/022,106, filed on Dec. 22, 2004, which is a continuation-in-part of application No. 10/386,894, filed on Mar. 11, 2003, now Pat. No. 7,047,883, application No. 11/552,219, which is a continuation-in-part of application No. 10/706, 142, filed on Nov. 12, 2003, which is a division of application No. 09/351,102, filed on Jul. 8, 1999, now Pat. No. 6,761,959, application No. 11/552,219, which is a continuation-in-part of application No. 11/047, 389, filed on Jan. 31, 2005, now Pat. No. 7,224,528, which is a continuation of application No. 10/705,610, filed on Nov. 10, 2003, now abandoned, which is a division of application No. 09/489,250, filed on Jan. 21, 2000, now abandoned.

(60) Provisional application No. 60/759,350, filed on Jan. 17, 2006, provisional application No. 60/729,907, filed on Oct. 25, 2005, provisional application No. 60/673,080, filed on Apr. 20, 2005, provisional application No. 60/410,546, filed on Sep. 13, 2002, provisional application No. 60/410,547, filed on Sep. 13, 2002, provisional application No. 60/396,210, filed on Jul. 15, 2002.

(51) Int. Cl.
*G03H 1/00* (2006.01)
*B42D 15/00* (2006.01)

(52) U.S. Cl. .............................................. 359/2; 283/85
(58) Field of Classification Search ..................... 359/2, 359/567; 283/85, 86
See application file for complete search history.

(56) References Cited

U.S. PATENT DOCUMENTS 2,570,856 A    10/1951  Pratt et al. ..................... 41/32

(Continued)

FOREIGN PATENT DOCUMENTS

AU            488652        11/1977

(Continued)

OTHER PUBLICATIONS

Llewellyn, "Dovids: Functional Beauty—discussion about holography", Paper, Film, and Foil Converter, Aug. 2002.

(Continued)

*Primary Examiner*—Alessandro Amari
(74) *Attorney, Agent, or Firm*—Matthew A. Pequignot; Pequignot + Myers LLC

(57) ABSTRACT

A security image and method for forming said image is disclosed wherein an image having a layer with a hologram therein has an additional layer of magnetically aligned flakes together forming an image that is difficult to counterfeit and is highly attractive. Preferably windows of an opaque layer provide additional means of encoding or forming the image.

22 Claims, 16 Drawing Sheets

U.S. PATENT DOCUMENTS

| | | | |
|---|---|---|---|
| 3,011,383 A | 12/1961 | Sylvester et al. | |
| 3,123,490 A | 3/1964 | Bolomey et al. | 106/291 |
| 3,293,331 A | 12/1966 | Doherty | 264/1.31 |
| 3,338,730 A | 8/1967 | Slade et al. | 428/142 |
| 3,610,721 A | 10/1971 | Abramson et al. | 350/3.5 |
| 3,627,580 A | 12/1971 | Krall | 117/238 |
| 3,633,720 A | 1/1972 | Tyler | 400/105 |
| 3,676,273 A | 7/1972 | Graves | 428/328 |
| 3,790,407 A | 2/1974 | Merton et al. | 428/148 |
| 3,791,864 A | 2/1974 | Steingroever | 117/238 |
| 3,845,499 A | 10/1974 | Ballinger | 346/74.3 |
| 3,853,676 A | 12/1974 | Graves | 161/5 |
| 3,873,975 A | 3/1975 | Miklos et al. | 360/25 |
| 4,011,009 A | 3/1977 | Lama et al. | 359/571 |
| 4,054,922 A | 10/1977 | Fichter | 346/74.3 |
| 4,066,280 A | 1/1978 | LaCapria | |
| 4,099,838 A | 7/1978 | Cook et al. | 359/537 |
| 4,126,373 A | 11/1978 | Moraw | |
| 4,155,627 A | 5/1979 | Gale et al. | |
| 4,168,983 A | 9/1979 | Vittands et al. | 106/14.12 |
| 4,197,563 A | 4/1980 | Michaud | 346/74.3 |
| 4,244,998 A | 1/1981 | Smith | |
| 4,271,782 A | 6/1981 | Bate et al. | 118/623 |
| 4,310,584 A | 1/1982 | Cooper et al. | 428/212 |
| 4,398,798 A | 8/1983 | Krawczak et al. | 359/573 |
| 4,434,010 A | 2/1984 | Ash | |
| 4,543,551 A | 9/1985 | Petersen | 335/284 |
| 4,657,349 A | 4/1987 | Labes et al. | 359/296 |
| 4,705,300 A | 11/1987 | Berning et al. | |
| 4,705,356 A | 11/1987 | Berning et al. | 350/166 |
| 4,721,217 A | 1/1988 | Phillips et al. | |
| 4,756,771 A | 7/1988 | Brodalla et al. | |
| 4,779,898 A | 10/1988 | Berning et al. | |
| 4,788,116 A | 11/1988 | Hochberg | 430/21 |
| 4,838,648 A | 6/1989 | Phillips et al. | 350/166 |
| 4,867,793 A | 9/1989 | Franz et al. | 106/415 |
| 4,930,866 A | 6/1990 | Berning et al. | 350/320 |
| 4,931,309 A | 6/1990 | Komatsu et al. | 427/599 |
| 5,002,312 A | 3/1991 | Phillips et al. | |
| 5,009,486 A | 4/1991 | Dobrowolski et al. | |
| 5,059,245 A | 10/1991 | Phillips et al. | 106/22 |
| 5,079,058 A | 1/1992 | Tomiyama et al. | |
| 5,079,085 A | 1/1992 | Hashimoto et al. | 428/327 |
| 5,084,351 A | 1/1992 | Philips et al. | 428/411.1 |
| 5,106,125 A | 4/1992 | Antes | |
| 5,128,779 A | 7/1992 | Mallik | 359/2 |
| 5,135,812 A | 8/1992 | Phillips et al. | 428/403 |
| 5,142,383 A | 8/1992 | Mallik | 359/2 |
| 5,171,363 A | 12/1992 | Phillips et al. | 106/31.65 |
| 5,177,344 A | 1/1993 | Pease | 235/449 |
| 5,186,787 A | 2/1993 | Phillips et al. | 216/36 |
| 5,192,611 A | 3/1993 | Tomiyama et al. | 428/354 |
| 5,214,530 A | 5/1993 | Coombs et al. | |
| 5,223,360 A | 6/1993 | Prengel et al. | 430/39 |
| 5,254,390 A | 10/1993 | Lu | |
| 5,278,590 A | 1/1994 | Phillips et al. | 359/589 |
| 5,279,657 A | 1/1994 | Phillips et al. | |
| 5,339,737 A | 8/1994 | Lewis et al. | |
| 5,364,467 A | 11/1994 | Schmid et al. | |
| 5,364,689 A | 11/1994 | Kashiwagi et al. | 428/195 |
| 5,368,898 A | 11/1994 | Akedo | 427/510 |
| 5,411,296 A | 5/1995 | Mallik | 283/86 |
| 5,424,119 A | 6/1995 | Phillips et al. | 428/328 |
| 5,437,931 A | 8/1995 | Tsai et al. | 428/446 |
| 5,447,335 A | 9/1995 | Haslop | 283/91 |
| 5,464,710 A | 11/1995 | Yang | |
| 5,474,814 A | 12/1995 | Komatsu et al. | 427/549 |
| 5,549,774 A | 8/1996 | Miekka et al. | |
| 5,549,953 A | 8/1996 | Li | |
| 5,571,624 A | 11/1996 | Phillips et al. | 428/403 |
| 5,591,527 A | 1/1997 | Lu | |
| 5,613,022 A | 3/1997 | Odhner et al. | 385/37 |
| 5,624,076 A | 4/1997 | Miekka et al. | |
| RE35,512 E | 5/1997 | Nowak et al. | |
| 5,627,663 A | 5/1997 | Horan et al. | 359/2 |
| 5,629,068 A | 5/1997 | Miekka et al. | |
| 5,630,877 A | 5/1997 | Kashiwagi et al. | 118/623 |
| 5,648,165 A | 7/1997 | Phillips et al. | |
| 5,650,248 A | 7/1997 | Miekka et al. | |
| 5,672,410 A | 9/1997 | Miekka et al. | |
| 5,700,550 A | 12/1997 | Uyama et al. | 428/212 |
| 5,742,411 A | 4/1998 | Walters | 359/2 |
| 5,744,223 A | 4/1998 | Abersfelder et al. | 428/206 |
| 5,763,086 A | 6/1998 | Schmid et al. | |
| 5,811,775 A | 9/1998 | Lee | 235/457 |
| 5,815,292 A | 9/1998 | Walters | 359/2 |
| 5,856,048 A | 1/1999 | Tahara et al. | |
| 5,858,078 A | 1/1999 | Andes et al. | |
| 5,907,436 A | 5/1999 | Perry et al. | 359/576 |
| 5,912,767 A | 6/1999 | Lee | |
| 5,989,626 A | 11/1999 | Coombs et al. | |
| 5,991,078 A | 11/1999 | Yoshitake et al. | 359/567 |
| 6,013,370 A | 1/2000 | Coulter et al. | |
| 6,031,457 A | 2/2000 | Bonkowski et al. | |
| 6,033,782 A | 3/2000 | Hubbard et al. | 428/407 |
| 6,043,936 A | 3/2000 | Large | 359/572 |
| 6,045,230 A | 4/2000 | Dreyer et al. | |
| 6,068,691 A | 5/2000 | Miekka et al. | |
| 6,082,778 A * | 7/2000 | Solmsdorf | 283/82 |
| 6,103,361 A | 8/2000 | Batzar et al. | 428/323 |
| 6,112,388 A | 9/2000 | Kimoto et al. | |
| 6,150,022 A | 11/2000 | Coulter et al. | |
| 6,157,489 A | 12/2000 | Bradley, Jr. et al. | |
| 6,168,100 B1 | 1/2001 | Kato et al. | |
| 6,241,858 B1 | 6/2001 | Phillips et al. | |
| 6,242,510 B1 | 6/2001 | Killey | |
| 6,243,204 B1 | 6/2001 | Bradley, Jr. et al. | |
| 6,403,169 B1 | 6/2002 | Hardwick et al. | 427/548 |
| 6,549,131 B1 | 4/2003 | Cote et al. | 340/572.1 |
| 6,586,098 B1 | 7/2003 | Coulter et al. | 428/403 |
| 6,589,331 B2 | 7/2003 | Ostertag et al. | 106/460 |
| 6,643,001 B1 | 11/2003 | Faris | 356/37 |
| 6,649,256 B1 | 11/2003 | Buczek et al. | 428/323 |
| 6,686,027 B1 | 2/2004 | Caporaletti et al. | 428/195.1 |
| 6,692,031 B2 | 2/2004 | McGrew | 283/93 |
| 6,692,830 B2 | 2/2004 | Argoitia et al. | 428/403 |
| 6,712,399 B1 | 3/2004 | Drinkwater et al. | 283/111 |
| 6,749,777 B2 | 6/2004 | Argoitia et al. | 252/582 |
| 6,749,936 B2 | 6/2004 | Argoitia et al. | 428/402 |
| 6,751,022 B2 | 6/2004 | Phillips | 359/577 |
| 6,759,097 B2 | 7/2004 | Phillips et al. | 427/510 |
| 6,761,378 B2 | 7/2004 | Souparis | 283/91 |
| 6,761,959 B1 | 7/2004 | Bonkowski et al. | 428/156 |
| 6,808,806 B2 | 10/2004 | Phillips et al. | 428/403 |
| 6,815,065 B2 | 11/2004 | Argoitia et al. | 428/403 |
| 6,818,299 B2 | 11/2004 | Phillips et al. | 428/403 |
| 6,841,238 B2 | 1/2005 | Argoitia et al. | 428/403 |
| 6,902,807 B1 | 6/2005 | Argoitia et al. | |
| 6,903,850 B2 | 6/2005 | Kay et al. | 359/883 |
| 6,987,590 B2 | 1/2006 | Phillips et al. | 359/614 |
| 7,005,178 B2 | 2/2006 | Bonkowski et al. | 428/156 |
| 7,029,525 B1 | 4/2006 | Mehta | 106/31.6 |
| 7,029,745 B2 | 4/2006 | Bonkowski et al. | 428/195.1 |
| 7,047,883 B2 | 5/2006 | Raksha et al. | 101/489 |
| 7,054,042 B2 | 5/2006 | Holmes et al. | 359/2 |
| 7,169,472 B2 | 1/2007 | Raksha et al. | 428/403 |
| 7,224,528 B2 | 5/2007 | Phillips et al. | 359/15 |
| 7,229,520 B2 | 6/2007 | Huang et al. | |
| 7,241,489 B2 | 7/2007 | Argoitia et al. | 427/7 |
| 7,258,900 B2 | 8/2007 | Raksha et al. | 427/598 |
| 7,258,915 B2 | 8/2007 | Argoitia et al. | 428/323 |
| 7,300,695 B2 | 11/2007 | Argoitia et al. | 428/402 |
| 2003/0190473 A1 | 10/2003 | Argoitia | |
| 2004/0009309 A1 | 1/2004 | Raksha et al. | 427/598 |

| | | | |
|---|---|---|---|
| 2004/0051297 | A1 | 3/2004 | Raksha |
| 2004/0052976 | A1 | 3/2004 | Buczek et al. .............. 427/598 |
| 2004/0094850 | A1 | 5/2004 | Bonkowski et al. ......... 264/1.34 |
| 2004/0101676 | A1 | 5/2004 | Phillips et al. ................ 359/15 |
| 2004/0105963 | A1 | 6/2004 | Bonkowski et al. ...... 428/195.1 |
| 2005/0063067 | A1 | 3/2005 | Phillips et al. .............. 359/614 |
| 2005/0106367 | A1 | 5/2005 | Raksha et al. ............... 428/199 |
| 2006/0035080 | A1 | 2/2006 | Argoitia et al. ............. 428/402 |
| 2006/0077496 | A1 | 4/2006 | Argoitia ........................ 359/2 |
| 2006/0194040 | A1 | 8/2006 | Raksha et al. ............... 428/323 |
| 2007/0058227 | A1 | 3/2007 | Raksha et al. .................. 359/2 |

FOREIGN PATENT DOCUMENTS

| | | |
|---|---|---|
| DE | 1696245 | 1/1972 |
| DE | 3932505 | 4/1991 |
| DE | 4212290 | 5/1993 |
| DE | 4343387 | 6/1995 |
| DE | 19611383 | 9/1997 |
| DE | 19731968 | 1/1999 |
| DE | 19744953 | 4/1999 |
| DE | 19639165 | 10/2003 |
| EP | 0138194 | 10/1984 |
| EP | 0185396 | 12/1985 |
| EP | 0341002 | 11/1989 |
| EP | 0420261 | 4/1991 |
| EP | 0453131 | 10/1991 |
| EP | 0556449 | 8/1992 |
| EP | 0406667 | 1/1995 |
| EP | 0660262 | 1/1995 |
| EP | 0170439 | 4/1995 |
| EP | 0710508 | 5/1996 |
| EP | 0756945 | 2/1997 |
| EP | 0395410 | 8/1997 |
| EP | 0698256 | 10/1997 |
| EP | 0741370 | 5/1998 |
| EP | 0914261 | 5/1999 |
| EP | 0953937 | 11/1999 |
| EP | 0978373 | 2/2000 |
| EP | 1174278 | 1/2002 |
| EP | 1239307 | 9/2002 |
| EP | 1353197 | 10/2003 |
| EP | 1 498 545 A | 1/2005 |
| EP | 1516957 | 3/2005 |
| EP | 1529653 | 5/2005 |
| EP | 1719636 | 11/2006 |
| GB | 1107395 | 3/1968 |
| GB | 1131038 | 10/1968 |
| JP | 63172779 | 7/1988 |
| JP | 11010771 | 1/1999 |
| WO | WO 88/07214 | 9/1988 |
| WO | 93/23251 | 11/1993 |
| WO | 95/17475 | 1/1995 |
| WO | WO 95/13569 | 5/1995 |
| WO | 97/19820 | 6/1997 |
| WO | WO 98/12583 | 3/1998 |
| WO | WO 00/08596 | 2/2000 |
| WO | WO 01/03945 | 1/2001 |
| WO | WO 01/53113 A | 7/2001 |
| WO | WO 02/00446 | 1/2002 |
| WO | WO 02/04234 | 1/2002 |
| WO | WO 02/40599 | 5/2002 |
| WO | WO 02/40600 | 5/2002 |
| WO | WO 02/053677 | 7/2002 |
| WO | WO 02/090002 | 11/2002 |
| WO | WO 03/102084 | 12/2003 |
| WO | 2004/024836 | 3/2004 |
| WO | WO 2005/017048 | 2/2005 |
| WO | WO 2005/026848 | 3/2005 |

OTHER PUBLICATIONS

Hardin, "Optical tricks designed to foil counterfeiters" OE Reports, No. 191, Nov. 1999.

Himpsel et al., "Nanowires by step decoration", Mat. Research Soc. Bul., p. 20-24 (Aug. 1999).

Halliday et al., "Fundamental of Physics, Sixth Edition", p. 662, Jul. 2000.

Powell et al. (ED.), Vapor Deposition, John Wiley & Sons, p. 132 (1996).

Van Renesse (ed.), Optical Document Security, $2^{nd}$ Ed. Artech House, 254, 349-69, (1997).

Prokes et al. Novel Methods of Nanoscale Wire Formation, Mat. Research Soc. Bul., pp. 13-14 (Aug. 1999).

Lotz et al. "Optical Layers on Large Area Plastic Films", Precision, Applied Films (Nov. 2001).

Argoitia et al. "Pigments Exhibiting Diffractive Effects" Soc. Of Vac. Coaters, $45^{th}$ Annual Tech. Conf. Proceed. (2002).

Argoitia et al. "The concept of printable holograms through the alignment of diffractive pigments", SPIE Conference on Document Security, Jan. 2004.

John M. McKiernan et al. "Luminescence and Laser Action of Coumarin Dyes Doped in Silicate and Aluminosilicate Glasses Prepared by the Sol-Gel Technique," Journal of Inorganic and Organometallic Polymers, vol. 1, No. 1, 1991, pp. 87-103.

Jeffery I. Zink et al. "Optical Probes and properties of Aluminosilicate Glasses Prepared by the Sol-Gel Method," Polym. Mater Sci. Eng. p. 204-208 (1989).

Don. Tompkins et al. Transparent Overlays for Security Printing and Plastic ID Cards, p. 1-8, Nov. 1997.

The Mearl Corporation brochure for "Mearl Iridescent Film", Peekskill, NY.

J.A. Dobrowski et al., Optical Interference Coatings for Inhibiting of Counterfeiting, Optica Acta, 1973, vol. 20, No. 12, 925-937.

The R.D. Mathis Company Manual for "Thin Film Evaporation Source Reference," Long Beach, CA.

Minolta Manual for Precise Color Communications, Color Control from Feeling to Instrumentation, p. 18, 20, 22, 23, 46, 47, 48 and 49.

Frans Defilet, LGZ Landis & Gyr Zug Corporation, "Kinegrams Optical Variable Devices (OVD's) for Banknotes, Security Documents and Plastic Cards", San Diego, Apr. 1-3, 1987.

S.P. McGrew, "Hologram Counterfeiting: Problems and Solutions", SPIE, vol. 1210, Optical Security and Anticounterfeiting Systems, 1990, p. 66-67.

Rudolf L. van Renesse, "Security Design of Valuable Documents and Products", SPIE, vol. 2659, Jun. 1996, pp. 10-20.

Steve McGrew, "Countermeasures Against Hologram Counterfeiting" Internet site www.iea.com/nli/publications/countermeasures.htm, Jan. 6, 2000.

Roger Phillips, "Optically Variable Films, Pigments, and Inks", SPIE vol. 1323, Optical Thin Films III: New Developments, 1990, p. 98-109.

Roger Phillips et al. "Optical Coatings for Document Security", Applied Optics, vol. 35, No. 28, Oct. 1, 1996, p. 5529-5534.

J. Rolfe, "Optically Variable Devices for Use on Bank Notes", SPIE, vol. 1210, Optical Security and Anticounterfeiting Systems, pp. 14-19, 1990.

OVD Kinegram Cor, "OVD Kinegram Management of Light to Provide Security", Internet site www.kiknegram.com/xhome/home.html, Dec. 17, 1999.

I.M. Boswarva, et al. "Roll Coaster System for the Production of Optically Variable Devices (OVD's) for Security Applications", Proceedings, $33^{rd}$ Annual Technical Conference, Society of Vacuum Coaters, pp. 103-109 (1990).

Coombs et al. "Integration of Contracting Technologies into Advanced optical Security Devices", SPIE Conference on Document Security, Jan. 2004.

"Security Enhancement of Holograms with interference Coatings", by Phillips et al. Optical Security and Counterfeit Deterrence Technique III Proceesdings of SPIE, ol. 3973, p. 304-316, (2000).

R. Domnick et al, "Influence of Nanosized Metal Clusters on the Generation of Strong Colors and Controlling of their Properties through Physical Vapor Deposition (PVD)" $49^{th}$ Annual Technical Conference Proceedings (2006), Society of vacuum Coasters.

"Optical Thin-Film Security Devices", J.A. Dobrowolski, Optical Security Document, Rudolf Van Renesse, Artech House, 1998, pp. 289-328.

"Paper Based Document Security—a Review" Rudolf L. van Renesse, European Conference on Security and Detection, Apr. 28-30, 1997, Conference Publication No. 437, p. 75-80.

Diffractive Microstructures for Security Applications: M. T. Gale, Paul Scherrer Institute, Zurich, IEEE Conference Publication London 1991, pp. 205-209, Sep. 16-18, 1991.

"Research on thin film anticounterfeiting coatings at the National Research Council of Canada", J. A. Dobrowolski et al., Applied Optics, vol. 28, No. 14, Jul. 15, 1989, pp. 2702-2717.

Definition of "directly" from Webster's Third New International Dictionary, 1993, p. 641.

* cited by examiner

Direction of viewing of cross-sections cut along planes 11 and 12

Cross-section viewing direction

PATTERNED OPTICAL STRUCTURES WITH ENHANCED SECURITY FEATURE

CROSS REFERENCE TO RELATED APPLICATIONS

This application claims priority from provisional application No. 60/759,350 filed Jan. 17, 2006 and provisional application No. 60/729,907 filed Oct. 25, 2005, the disclosures of which are hereby incorporated in their entirety for all purposes.

This application is a continuation-in-part application of patent application Ser. No. 11/273,985 filed Nov. 15, 2005, which is a continuation-in-part application of patent application Ser. No. 10/666,318 filed on Sep. 18, 2003, issued as U.S. Pat. No. 6,987,590; and claims priority from provisional patent application Ser. No. 60/673,080 filed Apr. 20, 2005; the disclosures of which are hereby incorporated in their entirety for all purposes.

This application is a continuation-in-part application of patent application Ser. No. 11/313,165 filed Dec. 20, 2005, which is a continuation-in-part application of patent application Ser. No. 11/022,106, filed Dec. 22, 2004, which is a continuation-in-part application of patent application Ser. No. 10/386,894 filed Mar. 11, 2003, now issued as U.S. Pat. No. 7,047,883, which claims priority from U.S. Provisional Patent Application Ser. No. 60/410,546 filed Sep. 13, 2002, from U.S. Provisional Patent Application Ser. No. 60/410,547 filed Sep. 13, 2002; and from U.S. Provisional Patent Application Ser. No. 60/396,210 filed Jul. 15, 2002, the disclosures of which are hereby incorporated in their entirety for all purposes.

This application is a continuation-in-part application of patent application Ser. No. 10/706,142 filed Nov. 12, 2003, which is a divisional application of patent application Ser. No. 09/351,102 filed Jul. 8, 1999, now issued as U.S. Pat. No. 6,761,959, the disclosures of which are hereby incorporated in their entirety for all purposes.

This application is a continuation-in-part application of patent application Ser. No. 11/047,389 filed Jan. 31, 2005, now U.S. Pat. No. 7,224,528 which is a continuation application of patent application Ser. No. 10/705,610 filed Nov. 10, 2003, now abandoned which is a divisional application of patent application Ser. No. 09/489,250 filed Jan. 21, 2000, now abandoned the disclosures of which are hereby incorporated in their entirety for all purposes.

THE FIELD OF THE INVENTION

The present invention is related generally to thin film optical coatings for use in producing security articles. More specifically, the present invention is related to the production of diffractive surfaces such as holograms or gratings which may have color-shifting, color switching, or optically variable backgrounds and which have a magnetically alignable pigment thereon aligned in a magnetic or electric field and which can be used as security articles in a variety of applications.

BACKGROUND OF THE INVENTION

Color-shifting pigments and colorants have been used in numerous applications, ranging from automobile paints to anti-counterfeiting inks for security documents and currency. Such pigments and colorants exhibit the property of changing hue upon variation of the angle of incident light, or as the viewing angle of the observer is shifted. The primary method used to achieve such color-shifting colorants is to disperse small flakes, which are typically composed of multiple layers of thin films having particular optical characteristics, throughout a medium such as paint or ink that may then be subsequently applied to the surface of an object. Color switching pigments appear to change color for example from a dark green to a light green, or from a light blue to a dark blue. Color switching pigments are described in U.S. Pat. No. 6,150,022 in the name of Coulter et al. Color switching pigments consist of bright metal flakes that are substantially reflective disposed in a liquid carrier vehicle that includes a dye. For example when a blue carrier vehicle is used, the flakes have a range of color from light to dark blue when they switch color upon a change in viewing angle.

Diffraction patterns and embossments, and the related field of holographs, have begun to find wide-ranging practical applications due to their aesthetic and utilitarian visual effects. For all intents and purposes, a diffraction pattern, whether embossed, etched or inked, is be understood to be a marked region. A marked region is to be understood to be a region having some form of indicia thereon, whether inked or stamped or etched. One very desirable decorative effect is the iridescent visual effect created by a diffraction grating. This striking visual effect occurs when ambient light is diffracted into its color components by reflection from the diffraction grating. In general, diffraction gratings are essentially repetitive structures made of lines or grooves in a material to form a peak and trough structure. Desired optical effects within the visible spectrum occur when diffraction gratings have regularly spaced grooves in the range of hundreds to thousands of lines per millimeter on a reflective surface.

Diffraction grating technology has been employed in the formation of two-dimensional holographic patterns which create the illusion of a three-dimensional image to an observer. Three-dimensional holograms have also been developed based on differences in refractive indices in a polymer using crossed laser beams, including one reference beam and one object beam. Such holograms are called volume holograms or 3D holograms. Furthermore, the use of holographic images on various objects to discourage counterfeiting has found widespread application.

There currently exist several applications for surfaces embossed with holographic patterns which range from decorative packaging such as gift wrap, to security documents such as bank notes and credit cards. Two-dimensional holograms typically utilize diffraction patterns which have been formed on a plastic surface. In some cases, a holographic image which has been embossed on such a surface can be visible without further processing; however, it is generally necessary to coat a reflective layer upon the embossed surface, typically a thin metal layer such as aluminum in order to achieve maximum optical effects. The reflective layer substantially increases the visibility of the diffraction pattern embossment.

Every type of first order diffraction structure, including conventional holograms and grating images, has a major shortcoming even if encapsulated in a rigid plastic. When diffuse light sources, such as ordinary room lights or an overcast sky, are used to illuminate the holographic image, all diffraction orders expand and overlap so that the diffraction colors are lost and not much of the visual information contained in the hologram is revealed. What is typically seen is only a silver colored reflection from the embossed surface and all such devices look silvery or pastel, at best, under such viewing conditions. Thus, holographic images generally require direct specular illumination in order to be visualized. This means that for best viewing results, the illuminating light must be incident at the same angle as the viewing angle.

Since the use of security holograms has found widespread application, there exists a substantial incentive for counterfeiters to reproduce holograms which are frequently used in credit cards, banknotes, and the like. Thus, a hurdle that security holograms must overcome to be truly secure, is the ease at which such holograms can be counterfeited. One step and two step optical copying, direct mechanical copying and even re-origination have been extensively discussed over the Internet. Various ways to counteract these methods have been explored but none of the countermeasures, taken alone, has been found to be an effective deterrent.

One method used to reproduce holograms is to scan a laser beam across the embossed surface and optically record the reflected beam on a layer of a material such as a photopolymerizable polymer. The original pattern can subsequently be reproduced as a counterfeit. Another method is to remove the protective covering material from the embossed metal surface by ion etching, and then when the embossed metal surface is exposed, a layer of metal such as silver (or any other easily releasable layer) can be deposited. This is followed by deposition of a layer of nickel, which is subsequently released to form a counterfeiting embossing shim.

Due to the level of sophistication of counterfeiting methods, it has become necessary to develop more advanced security measures. One approach, disclosed in U.S. Pat. Nos. 5,624,076 and 5,672,410 to Miekka et al., where embossed metal particles or optical stack flakes are used to produce a holographic image pattern.

A further problem with security holograms is that it is difficult for most people to identify and recollect the respective images produced by such holograms for verification purposes. The ability of the average person to authenticate a security hologram conclusively is compromised by the complexity of its features and by confusion with decorative diffractive packaging. Thus, most people tend to confirm the presence of such a security device rather than verifying the actual image. This provides the opportunity for the use of poor counterfeits or the substitution of commercial holograms for the genuine security hologram.

In other efforts to thwart counterfeiters, the hologram industry has resorted to using more complex images such as producing multiple images as the security device is rotated. These enhanced images provide the observer with a high level of "flash" or aesthetic appeal. Unfortunately, this added complexity does not confer added security because this complex imagery is hard to communicate and recollection of such imagery is difficult, if not impossible, to remember.

It would therefore be of substantial advantage to develop improved security products which provide enhanced viewing qualities in various lighting conditions, especially in diffuse lighting, and which are usable in various security applications to make counterfeiting more difficult.

Security articles having diffractive surfaces and color-shifting backgrounds are described U.S. patent application Ser. Nos. 20040105963 A1, 20040101676 A1, 20040094850 A1, and 20040081807 A1. Such security devices include a transparent holographic substrate coated with a color-shifting layer on the side opposite to the holographic embossing. The color-shifting optical coating provides an observable color shift as the angle of incident light, or viewing angle, changes. The color-shifting coating can be fabricated by vacuum deposition of an optical interference structure onto the corresponding surface of the substrate, by spraying of a paint containing color-shifting pigment, or by printing ink as by flexographic, gravure or Intaglio means.

A patterned layer of a reflective material might be applied over predetermined portions of the holographic substrate to form alphanumeric characters, bar codes, pictorial or graphic designs as described in WO 2005/026848 A2. To produce such, a highly reflective material needs to be deposited on the top of the holographic substrate and etched out from predetermined portions of the substrate. As a result of demetalizing these areas of the substrate, where the metal was etched out, they become essentially transparent and the holographic effect there becomes almost invisible. In contrast, the portions of the substrate where the reflective metal was left on the surface in different predetermined shapes, maintain visible holographic properties.

Color-shifting coatings can be applied to such a demetalized structure in different ways. It can be applied to the side of the substrate opposite to the embossed side. In this manner the coating becomes visible through transparent demetalized portions of the substrate. Alternatively the color-shifting coating can be applied on the top of embossed side. The coating and patterned holographic elements become visible through the transparent substrate when the substrate is flipped over. This combination of hologram substrate and a color-shifting coating is called a "chromagram". General concept of chromagrams can be readily understood with reference to FIGS. 1 through 5.

Demetalized holograms are more difficult to counterfeit since one not only has to make the hologram but also demetalize an intricate pattern in register with the holographic pattern.

It is an object of this invention, to provide an image that can be used as a security device, that is very difficult for counterfeiters to copy, and that can readily be authenticated.

It is a further object of the invention to provide a security device that offers a high degree of security while at same time providing considerable visual appeal.

SUMMARY OF THE INVENTION

In accordance with the invention there is provided a security device having a first region coated with magnetically aligned pigment particles; and, a second marked region different from the first printed region, wherein the magnetically aligned pigment forms an image that appears to move with a change in viewing angle or incident light, and wherein the second marked region serves as a frame of reference against which the image appears to move.

In accordance with the invention there is further provided, a security device having a first region coated with a magnetically aligned pigment and a second different region having a diffraction grating thereon, wherein the magnetically aligned pigment forms an image that appears to move with a change in viewing angle or angle of incident light, and wherein the diffraction grating serves as a frame of reference against which the image appears to move.

In accordance with the invention there is provided, a security device comprising a patterned reflective optical structure having:

a substrate having a diffraction grating therein or thereon;

an at least partially reflective layer adjacent to or near the diffraction grating; and, a layer of field aligned pigment supported by the substrate.

In accordance with the invention there is provided, a security device having a first region coated with a magnetically aligned pigment and a second different region having a diffraction grating thereon, wherein the magnetically aligned pigment forms an image that appears to move with a change in viewing angle or angle of incident light, and wherein the diffraction grating serves as a frame of reference against which the image appears to move, wherein the first region is contained within boundaries of the second region, or, wherein the second region is contained within boundaries of the first region, and wherein both the diffraction grating and the magnetically aligned pigment can be seen from one side of the device.

In accordance with the invention there is provided, a security device comprising a substrate having a surface that is partially embossed such that embossed regions on said surface are separated by non-embossed regions forming windows and a layer of magnetically aligned pigment above, below or within the windows and visible through the windows, whereby diffractive effects are seen from the embossed regions separate from effects seen from the magnetically aligned pigment seen through or in the windows when the device is irradiated with light.

In accordance with the invention there is provided, a security device that includes a layer having a diffractive region and a different layer having a magnetically aligned pigment, wherein when the device is irradiated with light, diffractive and kinematic effects are seen.

In accordance with a broad aspect of the invention there is provided, a security device comprising a layer having a diffraction pattern therein or thereon, and another layer formed of a color-shifting coating wherein only some regions of the color-shifting coating are magnetically aligned.

BRIEF DESCRIPTION OF THE DRAWINGS

Exemplary embodiments of the invention will now be described in conjunction with the drawings in which:

FIGS. 19b through 19d are figures of different magnetic arrangements that can be used to produce magnetic fields that can arrange the magnetically alignable pigment so that it appears is if the water is moving upon tilting the image of FIG. 19a.

DETAILED DESCRIPTION

Figure 1:
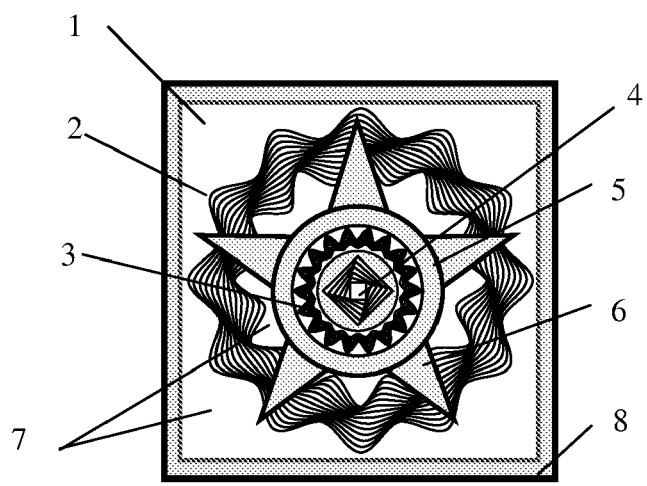
FIG. 1 is a security image formed in accordance with the prior art, wherein a polyester substrate is embossed with a pattern and wherein particular areas are metalized.

Referring now to FIG. 1 an image is shown having an embossed pattern. A polyester substrate 1 is shown to have several different regions defining specific features in the image. Region 2 is embossed and demetalized. This can readily be seen in FIG. 2. Regions 3 and 4 are embossed and metalized with a highly reflective coating of aluminum. The circle 5 and the star 6 were metalized with aluminum but not embossed. Region 7 shown in FIG. 1 was not embossed or metalized. The frame 8 was metalized but non-embossed. The fine lines 2 in the pattern of FIG. 1 were barely visible because they were not coated with a reflective metal. The star 6 and the circle 5 exhibit a silver-like appearance. The patterns in regions 3 and 4 have a rainbow colored appearance because of the diffractive nature of the light reflected from embossings on their surfaces.

Figure 2:
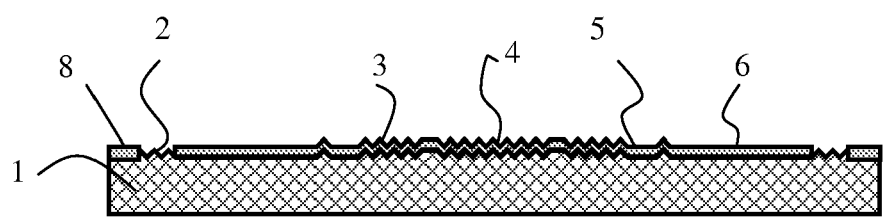
FIG. 2 is a cross section of the image of FIG. 1.
Figure 3:
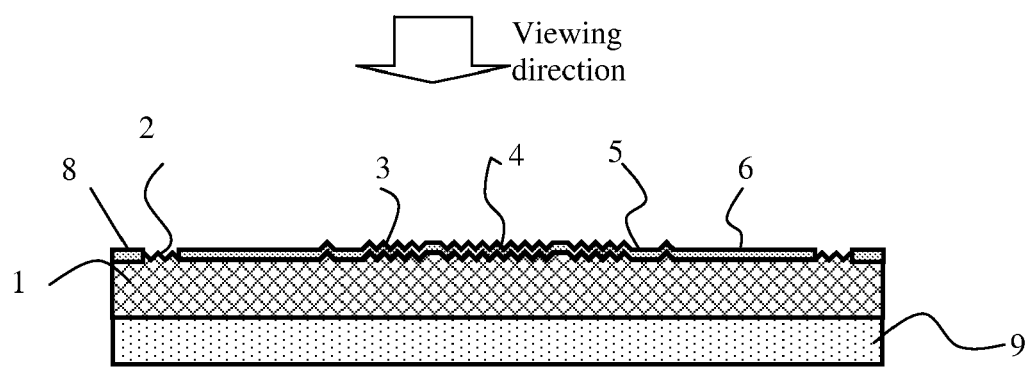
FIG. 3 is a cross section of a security image similar to FIG. 1 wherein an additional layer of color-shifting pigment has been deposited on the underside of the substrate.
Figure 4A:
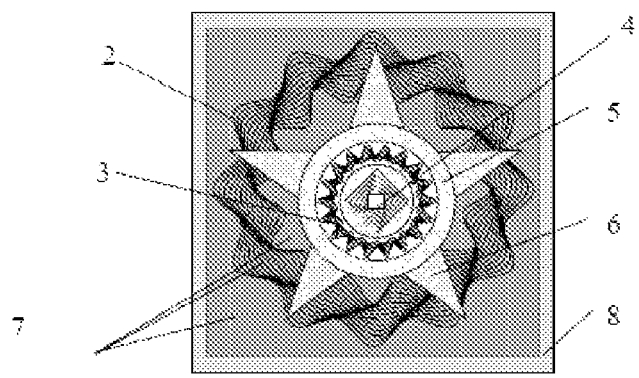
FIG. 4a is a plan view of the image of FIG. 3 having a diffraction grating and color-shifting coating under the grating.

FIG. 3 illustrates an improvement over the structure shown in FIG. 2 wherein a color-shifting coating 9 can be applied to the hologram shown in FIG. 1. The color-shifting coating 9 can be applied in two different ways, resulting in two different chromagrams. It can be applied to the surface of the holographic substrate that is opposite to the embossed side as shown in FIG. 3. In this instance the chromagram has an appearance as shown in FIG. 4a. The difference of this chromagram with the hologram in FIG. 1 is that the region 7 in FIGS. 3 and 4a has a color-shifting appearance.

Figure 4B:
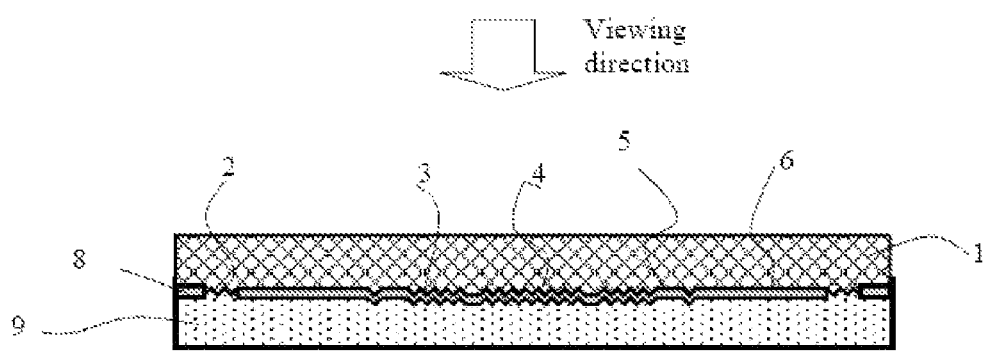
FIG. 4b is a cross sectional view of a structure wherein the grating or hologram is embossed on the underside of the substrate and wherein a color-shifting coating is directly next to the embossing.

According to another embodiment the color-shifting coating 9 can be applied on the top of embossing as shown in FIG. 4b. To view the effect the coated substrate needs to be flipped over as shown. In this instance the embossing 2 disappears because the refraction indices of the transparent substrate and the ink vehicle closely match one another. The chromagram has an appearance shown in FIG. 5.

Figure 5:
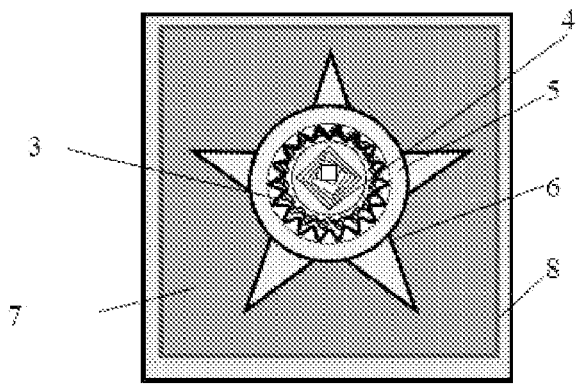
FIG. 5 is a plan view of the chroma shown in FIG. 4b.

The images shown in FIGS. 4a and 5 pictorially illustrate the concept of the "chromagrams" as an optical structure, for example a hologram or grating with a patterned demetalized layer of a reflective material applied over certain regions of the structure and an active optical coating applied over the patterned layer of reflective material and exposed portions of the surface of the structure.

In accordance with this invention, it is proposed to use a novel and inventive structure to form chromagrams for preventing of counterfeits of valuable documents, credit cards, banknotes, and the like.

Figure 6A:
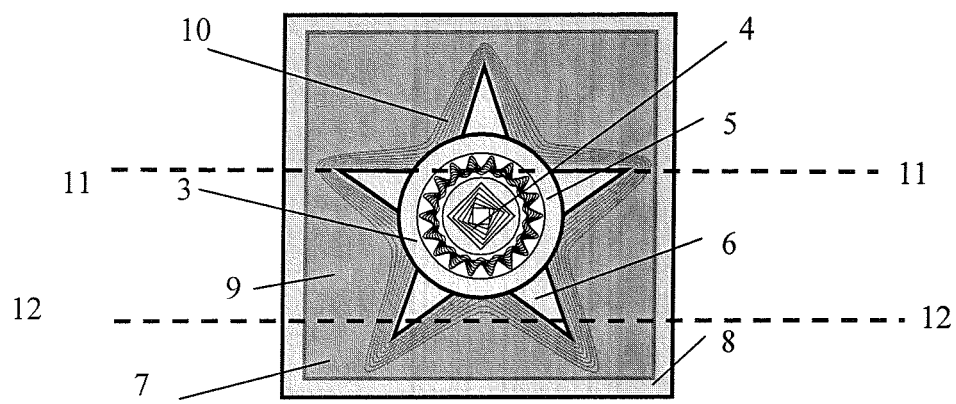
FIG. 6a is a plan view of an embodiment of the invention wherein a color-shifting magnetically aligned layer is adjacent to the hologram or diffraction grating yielding a chromagram that has optically-illusive color-shifting effects from the magnetically aligned color-shifting pigment and diffractive effects from the hologram.

In accordance with an aspect of the invention, it is possible to enhance the security properties of a patterned holographic structure by printing a color-shifting magnetically alignable optically visible coating or a non-color-shifting magnetically alignable optically visible coating and applying a magnetic field thereto to form in this layer either three dimensional patterns or three dimensional informative signs or patterns with illusive optical effects. The coating should be based on an ink containing platelet-like magnetic pigments for example as described U.S. Pat. No. 6,808,806, or in co-pending U.S. patent applications Ser. Nos. 20040051297, 20040166308, 20050123755, and 20060194040, incorporated herein by reference for all purposes. The term "magnetic pigment" is used to mean a pigment that will align in a magnetic field. E-field alignable pigments may be used in place of magnetic pigments when an electric field is used to align the pigment. Field alignable pigments are pigments that have flakes that will align in a magnetic or electric field. Of course permanent magnets or electro-magnets can be used to generate magnetic fields. In accordance with this invention, the magnetic pigment can be color-shifting or non-color-shifting. The ink vehicle can be clear or dyed. To make a structure with the enhanced security properties, the ink needs to be printed on the surface of the substrate as it was done for the above mentioned described chromagrams. The substrate with a layer of wet ink is moved into a magnetic field to form the illusory image. Preferably, the field is shaped to a desired, desirable, or predetermined pattern. When the wet ink is exposed to a magnetic or electric field, flat magnetic or e-field alignable particles of the pigment align along magnetic lines of the field. This is shown in FIGS. 6a, 6b and 7b.

Figure 6B:
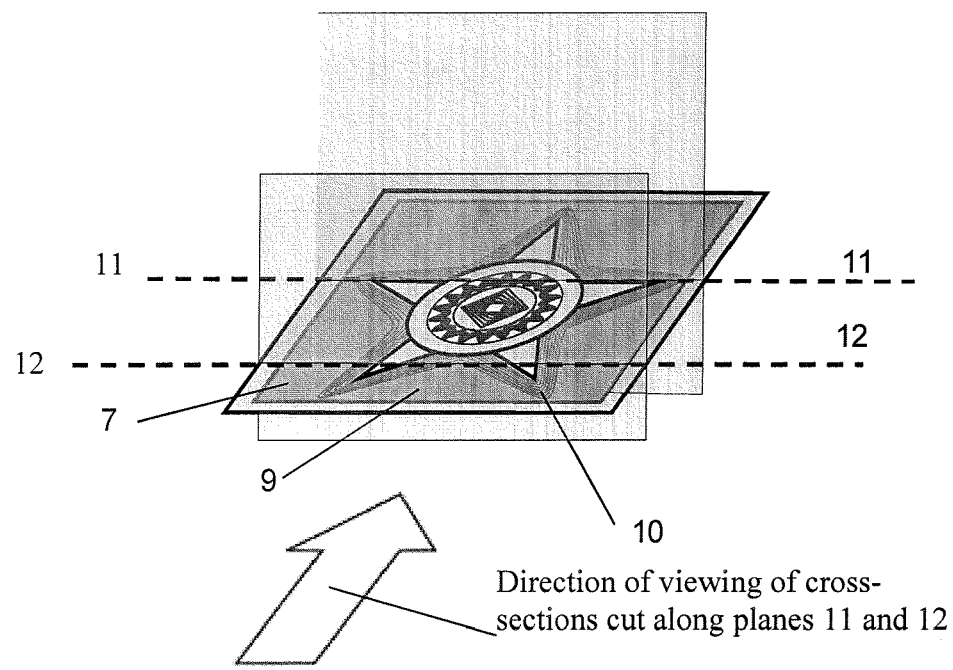
FIG. 6b is a view of the embodiment shown in FIG. 6a whereby planes through sections 11 and 12 taken in FIG. 6a are shown.

FIG. 6b more clearly illustrates an extended view whereby the planes along where the cross-section is taken can be viewed.

Figure 7A:
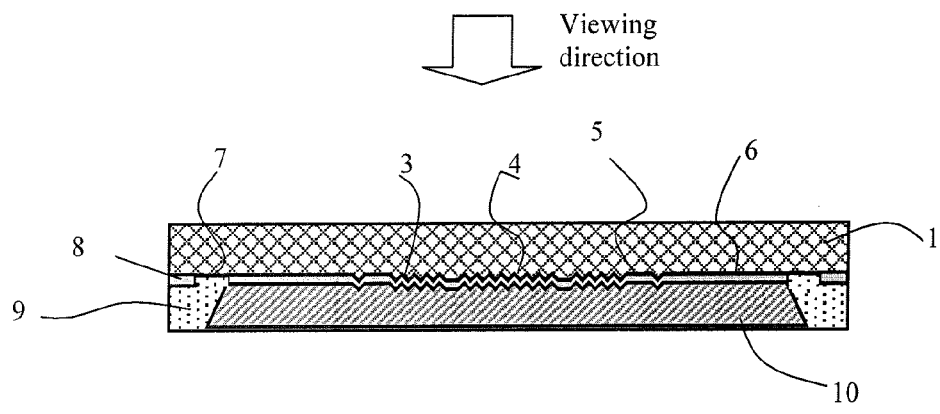
FIG. 7a is a detailed cross-section of the chromagram shown in FIG. 6a taken along line 11 in the plane shown if FIG. 6b.
Figure 7B:
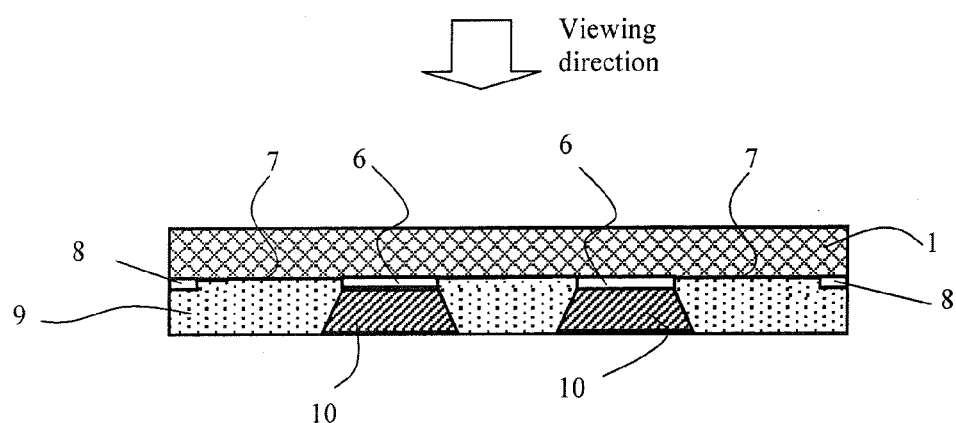
FIG. 7b is a detailed cross-section of the chromagram shown in FIG. 6a taken along line 12 in the plane through line 12 shown if FIG. 6b.

Turning now to FIG. 6a an image is shown having two section lines 11 and 12 indicating cross-sections taken along lines 11-11 and 12-12. The cross sectional drawing taken along line 11 is shown in FIG. 7a, and the cross-sectional drawing taken along line 12 is shown in FIG. 7b.

UV or e-beam or thermal curing of the ink vehicle directly within the field or shortly after its exposure to the field fixes magnetic particles inside of the layer of the ink at their aligned positions. When the ink is illuminated by the light source and observed with a naked eye or with an optical instrument the differently aligned platelet-like shaped magnetic pigment particles reflect incident light differently. One portion of the particles is so oriented with respect to the substrate, to the light source and to the observer that it reflects coming light rays right into the eye of the observer. Another portion of the particles of the print reflects light rays in different directions because they are tilted at different angles relative to the direction of the observer. When the substrate with printed coating is tilted with respect to the light source or the observer the first portion of the pigment particles does not reflect the light toward the observer any more. These particles start to reflect the light in different direction while the particles of the second portion start to reflect the light rays in the direction of the observer. When particles are aligned gradually in the layer of the ink, tilting of the substrate causes appearance of an illusive motion effect. When particles are aligned along the lines of a magnet that was shaped in predetermined pattern a portion of the printed layer repeats the shape of the magnet creating an effect of three-dimensionality. In this region it appears as if the image comes out of the substrate toward the observer.

FIG. 6a shows a chromagram fabricated according to the procedure described in FIGS. 4 and 5. The color-shifting coating 9 in this figure was fabricated by printing of a color-shifting magnetic ink on the surface of a partially demetalized hologram 3. After the printing was completed the hologram with wet ink was placed in the magnetic field of a star shaped magnet and subsequently cured with UV light. When viewed in the direction of the arrow as shown in FIG. 7a, the chromagram shows presence of the star 10 that has virtual height close to 0.25".

The chromagram with the enhanced security feature has a magnetically printed star around the star in hologram 2. It is generally important that the magnetically introduced pattern of the print was a part of the graphical design of the security article.

Figure 8:
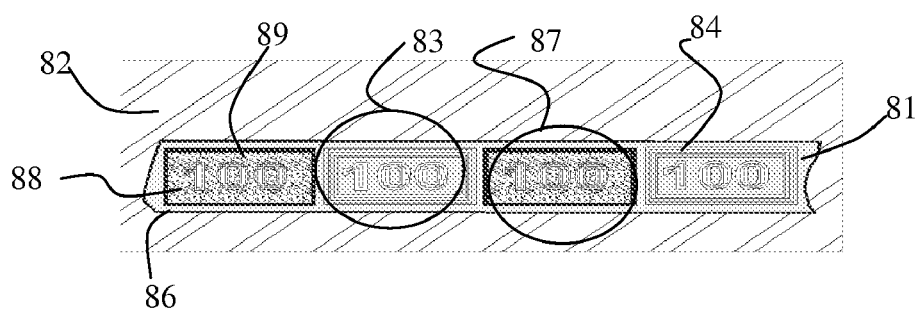
FIG. 8 is a plan view of a magnetic print and the graphical design for a security thread used on banknotes.
Figure 9:
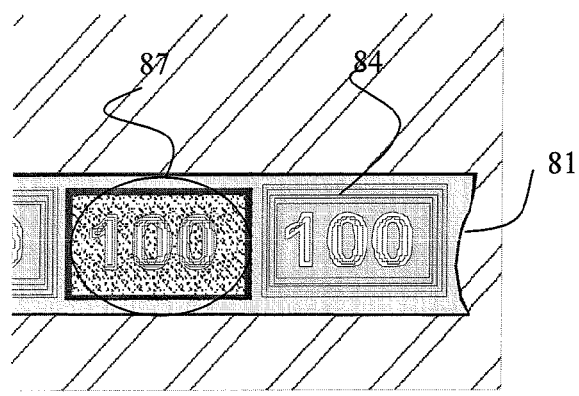
FIG. 9 is a more detailed view of a portion of FIG. 8.
Figure 10:
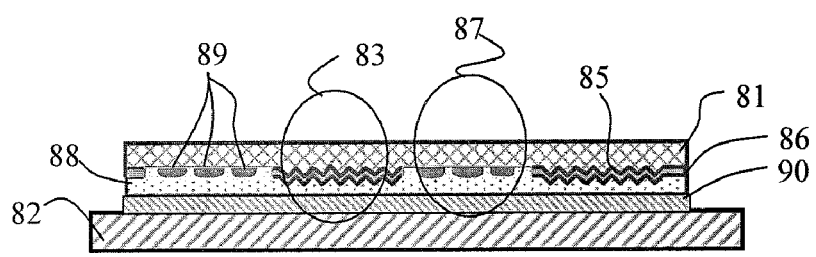
FIG. 10 is a cross-section as shown in FIGS. 8 and. 9 wherein the thread was flipped over after curing of the ink and laminated with adhesive to the paper.

The magnetically formed image can be placed inside of a holographic image. An example of such combination of a magnetic print and the graphical design for a security thread of banknotes is illustrated in FIGS. 8, 9, and 10 and 9. In FIG. 10 a polyester substrate 81 which is partially aluminized has a layer of magnetically aligned flakes thereunder as shown.

The security thread 81 is attached to the paper substrate 882 by traditional technology. The thread 81 is made from a thin transparent polyester substrate, embossed in certain regions 83 with a shape of a rectangular frame 84 and the number 100 inside of the frame 84. Both the frame 84 and the 100 in the region 83 are embossed with diffractive grooves 85 using known technology for forming holograms.

Due to the embossing, a rainbow-colored diffractive pattern of the frame with the number 100 in the area 83 results. The embossed side of the substrate was coated with a thin aluminum layer 86. Part of aluminum was etched off the substrate leaving rectangular windows 87 of the same size as the frames 84 of embossed boxes in the area 83. Color-shifting ink 88 was applied to the embossed and partially aluminum-coated side of the substrate 82. The substrate with the wet ink 88 was placed in the magnetic field providing alignment of magnetic particles in the shape 89 of the number 100 with the same size as the size of 100 in the holographic part of the thread. The magnetically formed number 100 has a three-dimensional like appearance. The thread was flipped over after curing of the ink and laminated with adhesive 1090 to the paper 82 with the color-shifting ink coated side as shown in the cross-section of the chromagram in FIG. 10. The three-dimensional like magnetically formed number 100 can be seen through the polyester substrate 82 in demetalized boxes 87 as well as rainbow-colored holographic images of the number 100 can be seen in holographic boxes 83.

Figure 11:
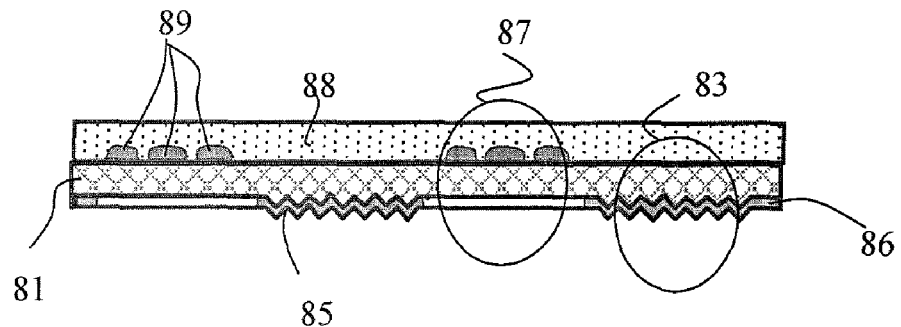
FIG. 11 is a cross-sectional view of an alternative embodiment wherein the aligned color-shifting coating is deposited on an opposite side of the substrate from the segmented diffraction grating.
Figure 12:
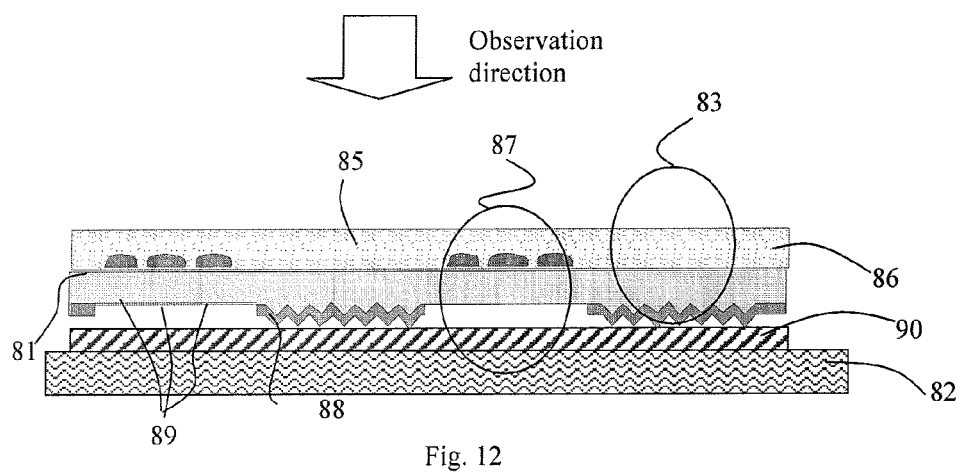
FIG. 12 is a cross-sectional view of an alternative embodiment wherein the color-shifting coating 8 is applied to a non-embossed side on the substrate and placed into a field to align magnetic particles to form the 100 pattern; and after curing of the ink the structure is laminated to a paper with adhesive.

Enhanced chromagrams can also be fabricated by an alternative method. In contrast to the chromagrams in FIGS. 9 and 10, the color-shifting coating 88 in this method can be applied to the non-embossed side on the substrate 81 as shown in FIGS. 11 and 12 and placed into the field to align magnetic particles to form the 100 pattern 89. After curing of the ink 8 with aligned magnetic pigment, the structure shown in FIG. 11 was turned over and laminated to the paper 82 with adhesive 90 as shown in FIG. 12. The three-dimensional like magnetically formed pattern 89 of the number 100 can be seen through the polyester substrate 81 in demetalized windows 87 and the rainbow-colored holographic images of the number 100 surrounded by the frame in the area 83.

The chromagrams in FIGS. 6 through 12 described samples when magnetically generated prints were placed either outside or inside of a demetalized holographic image. In some cases demetalized holographic embossing may overlap the magnetically formed image to enhance its appearance. Examples of such a chromagram is shown in several figures below. Polyester substrate 131 in FIG. 13 has an aluminum metalized embossed frame 132 and metalized embossed contours 133 of the sign 134 in the shape of AB. The regions 135, 136, 137, 138 and 139 are demetalized.

Figure 13:
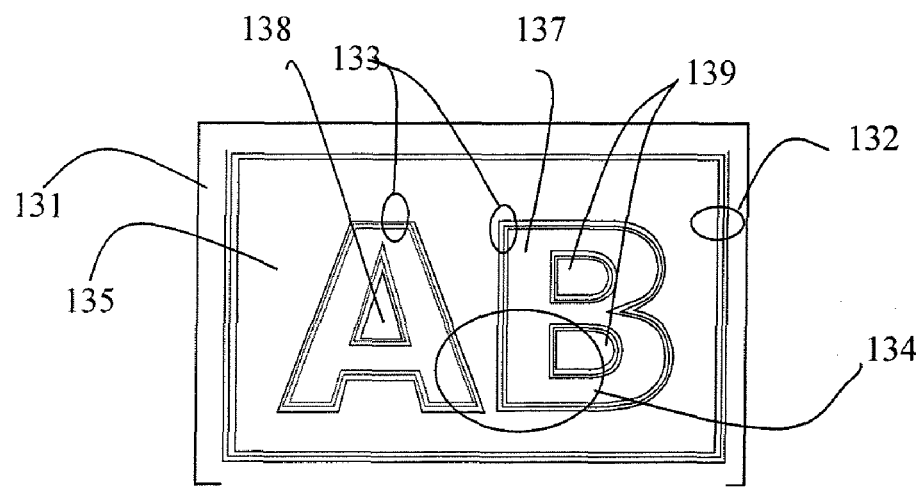
FIG. 13 is a demetalized holographic embossing overlap the magnetically formed image to enhance its appearance having an aluminum metalized embossed frame and metalized embossed contours in the shape of the letters AB.
Figure 14:
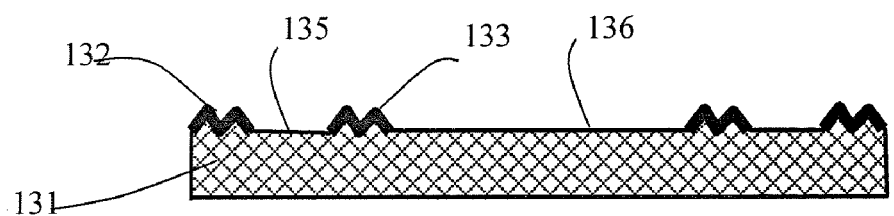
FIG. 14 is a cross-section of the substrate of FIG. 13.
Figure 15:
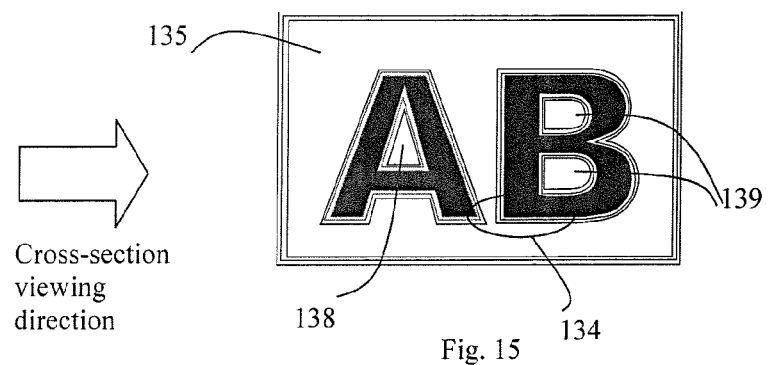
FIG. 15 is an image in accordance with an embodiment of the invention wherein color-shifting magnetically aligned flakes are disposed under a hologram.

A cross-section of the substrate 1 with demetalized pattern of FIG. 13 is shown in FIG. 14. Magnetic ink containing magnetically orientable particles is separately printed in two areas on the top of the embossed substrate. In exemplary embodiments gold to blue color-shifting ink was applied in one sample, colored color switching non-color-shifting ink vehicle was applied in another sample, and magnetic diffractive ink was applied in another sample. While wet, each of the prints was separately oriented in an applied magnetic field and separately cured. The printed substrate was flipped over so as to face and receive incident light rays with its non-embossed side and laminated to the paper 142 with the adhesive 133. Different orientation of magnetic pigment particles created color or contrast difference in printed areas as shown in FIG. 15. Layer 141 of the ink, in the background areas 135, 138 and 139 are bright gold at a normal angle of observation. The sign AB is blue at this angle while the frame 132 and contours 133 have rainbow-like colors. Alignment of the pigment particles and the light rays reflection are shown in the cross-section of the structure in FIG. 16.

The AB 134 was printed in the margins of the sign's contour lines 133. A magnetic field applied to the layer 140 of the wet ink provided alignment of the pigment particles as shown in FIG. 14. Layer 141 of the ink in the background areas 135, 138 and 139 has different alignment of particles. The particles here are almost parallel to the substrate.

Figure 16:
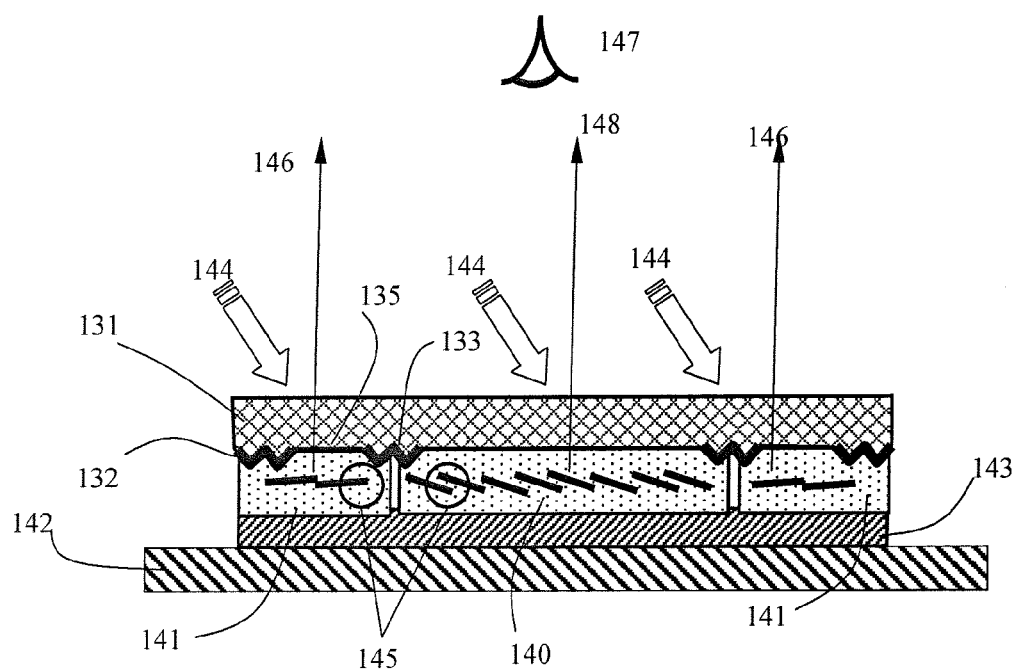
FIG. 16 is a cross-sectional view of the image of FIG. 15.

Observations of the structure in FIGS. 15 and 16 show that the rays 144 incident from a distant light source penetrate the transparent polyester substrate 131 and are reflected from the magnetic particles 145 of the pigment. The direction of reflection of the light rays depends on two factors: alignment of the particles dispersed in the cured ink vehicle and the observation angle. At normal angle, as shown in FIG. 16, the light rays 144, reflected from the particles in the background layer 141, shine in the direction 146 to the observer 147. The observer sees a gold background layer 141 and sees this in areas 135, 138 and 139 in FIG. 15. The particles in the layer 140 of the sign AB are tilted at a larger angle with respect to the viewer than the particles in the background layer 141. At this particular angle of observation the reflectance maximum of the particles shifts to the region of shorter wavelengths and the light of short wavelengths shines in the direction 148. The observer sees the sign AB as dark blue. The frame 132 and the contours 133 are rainbow-colored.

Figure 17:
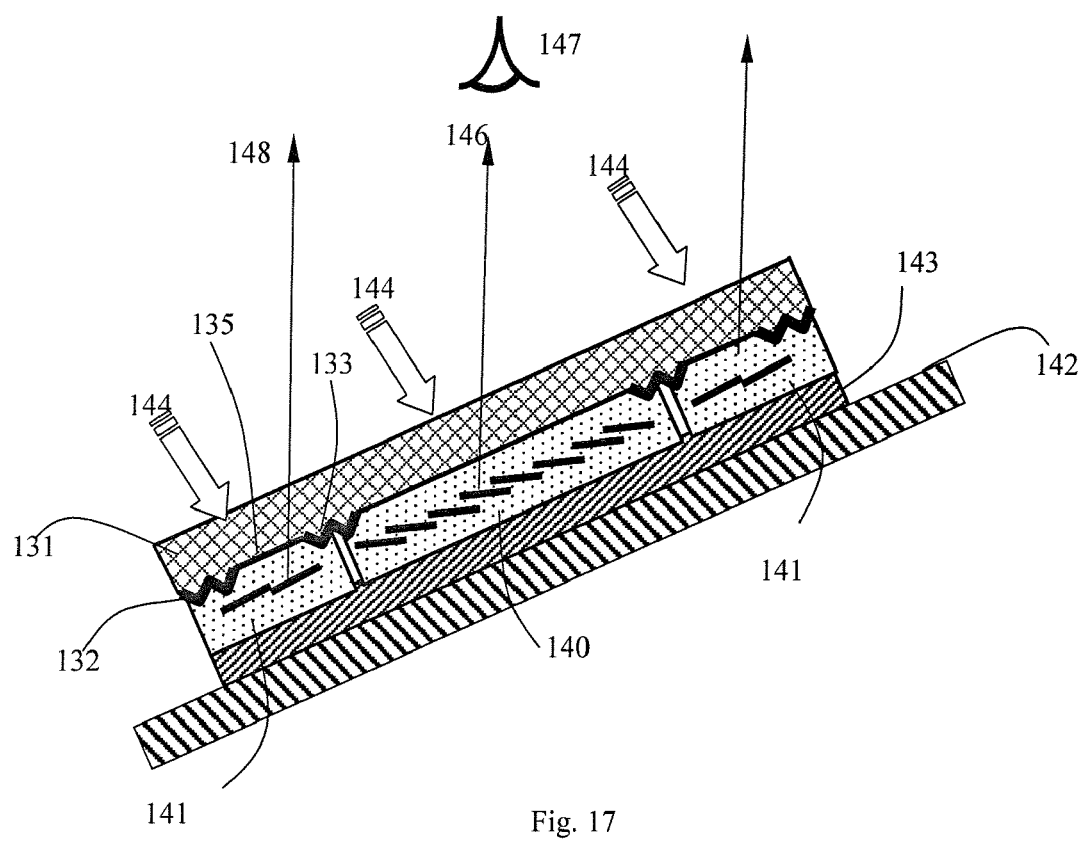
FIG. 17 is the cross-sectional view of the image of FIG. 15 shown tilted at a different angle than FIG. 16.

The tilt of the sample from the observer changes the observation angle of the particles. Particles in the layer 140, that is, the sign AB, are at a normal angle with respect to the observer while the particles in the background layer 141 are tilted as shown in FIG. 17. Layer 143 is an adhesive layer.

Figure 18:
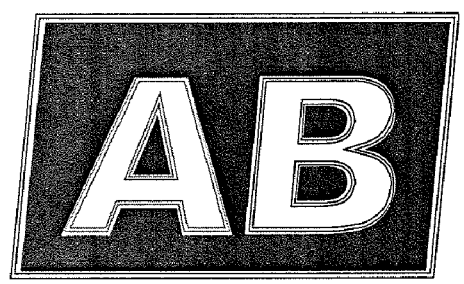
FIG. 18 is the image shown in FIG. 17.

Now the particles in the layer 140 reflect yellow light rays in the direction 146 and the observer sees the sign AB as gold in color. Background particles in layer 141 reflect blue light in the direction 148 and the observer sees dark blue background areas surrounding the sign AB as shown in FIG. 18. The frame 132 and the contours 133 maintain the same rainbow colors.

In addition to the embodiments described above, an alternate structure is shown in FIG. 19a, which combines a magnetically formed image and a hologram, that has incredible appeal. The structures includes a transparent substrate with embossed holographic pattern. Regions are coated with metal and other regions are absent metal or demetalized. This is visible through the substrate and both the holographic effect and the magnetically aligned coating effect are viewed.

Figure 19A:
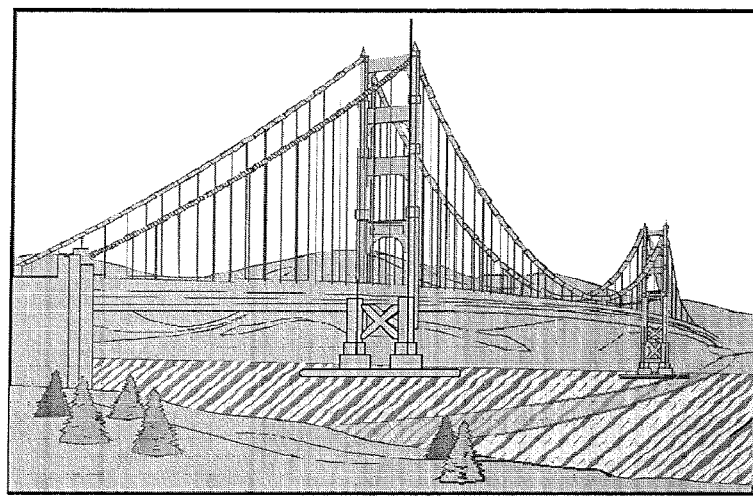
FIG. 19a is an image in accordance with an embodiment of this invention wherein a bridge is shown having water thereunder, wherein the water appears to move relative to the bridge as the image is tilted.
Figure 19B:
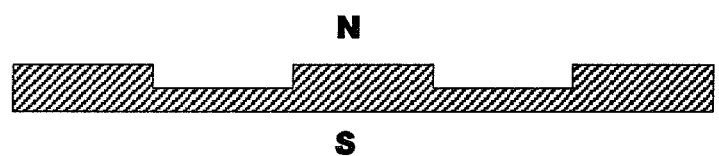
Figure 19C:
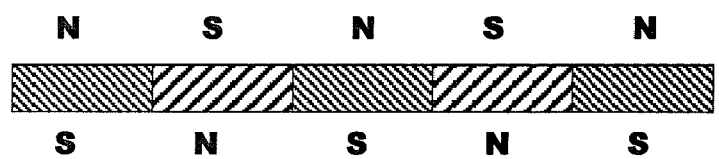
Figure 19D:
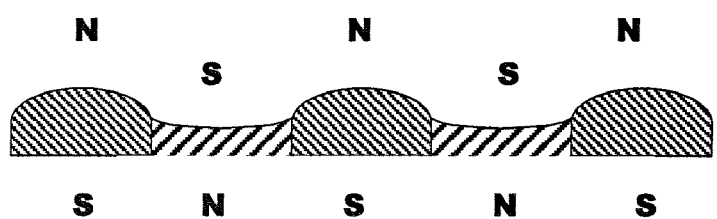
Figure 19E:
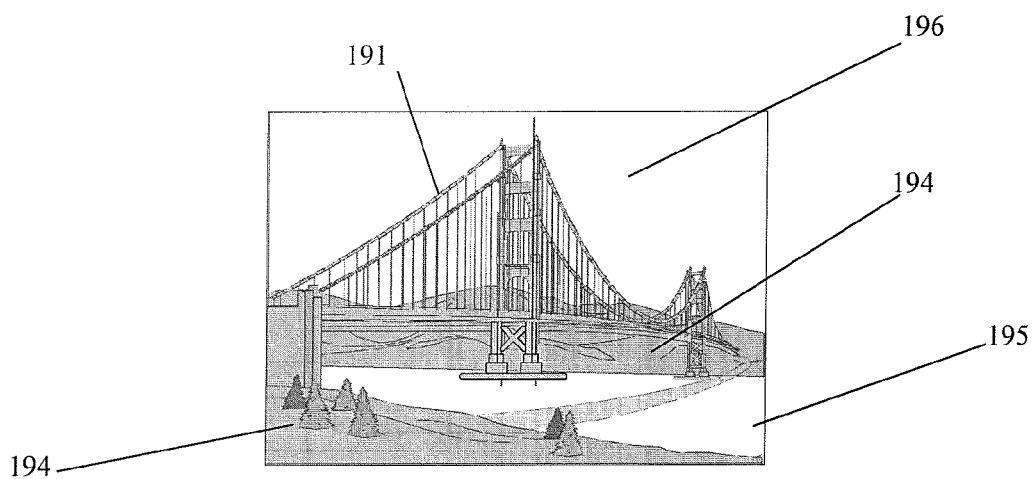
FIG. 19e is a view of the image in FIG. 19a prior to adding the color-shifting magnetic pigment and aligning the flakes in a magnetic field.

It has been discovered that the presence of reference points in an optically illusive image produces a very strong illusion of the depth within an image. For example using a magnetically aligned pigment with a reference point has significant advantages. The reference point could be anything located in close proximity the printed layer that could be seen by the naked eye and which provides awareness to the viewer of the location of the layer. The reference points include printing, writing, dusting or splattering of paint on the top surface of the magnetically oriented layer. Additionally, the surface of the printed layer could be textured by cutting, scratching, etching, or the like; provided a textured surface on the substrate so that a layer of the ink adhered thereto will have a textured surface; a top coat containing particles visible to the naked eye such as flakes, specks, etc. Turning now to FIGS. 19a and 19e, an optically illusive image useful as a security device to protect a substrate or contents of a package is shown. This image is printed in a manner similar to the aforementioned images, however a fixed printed image of a bridge 191 serves as a reference point juxtaposed with an optically illusive kinematic image of water which appears to move relative to the bridge. The bridge 191 and other elements of this figure are shown as fixed images that do not have optically illusive properties. In contrast, the water 193 underneath the bridge appears to move as the image is tilted or the direction of incident light upon the water 193 is varied. The contrast between a fixed portion of the image and a visually perceived moving portion of the image enhances the illusion of movement of the water 193. The bridge 191 and surrounding other fixed elements in the figure provide a frame of reference against which the water 193 under the bridge changes providing the appearance of movement. The bridge is a partially demetalized hologram; the landscape around the water can either be a transparent hologram coated with a high index transparent material or a selectively demetalized hologram. The sky can be a selectively demetalized hologram as well. The waves in the water 193 are printed with magnetic pigment aligned in an applied field along magnetic lines. Exemplary magnetic systems for alignment of particles to form the wave pattern are shown in FIGS. 19b through 19d, wherein the image is seen in the substrate above the magnets.

Figure 19F:
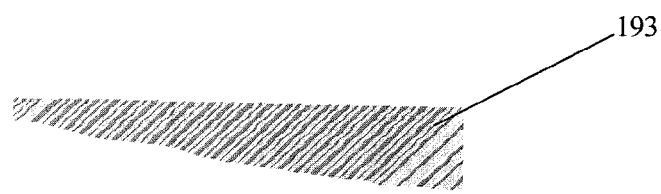
FIG. 19f is the image of water added to the image in FIG. 19e by printing magnetic ink and applying magnetic field.
Figure 20B:
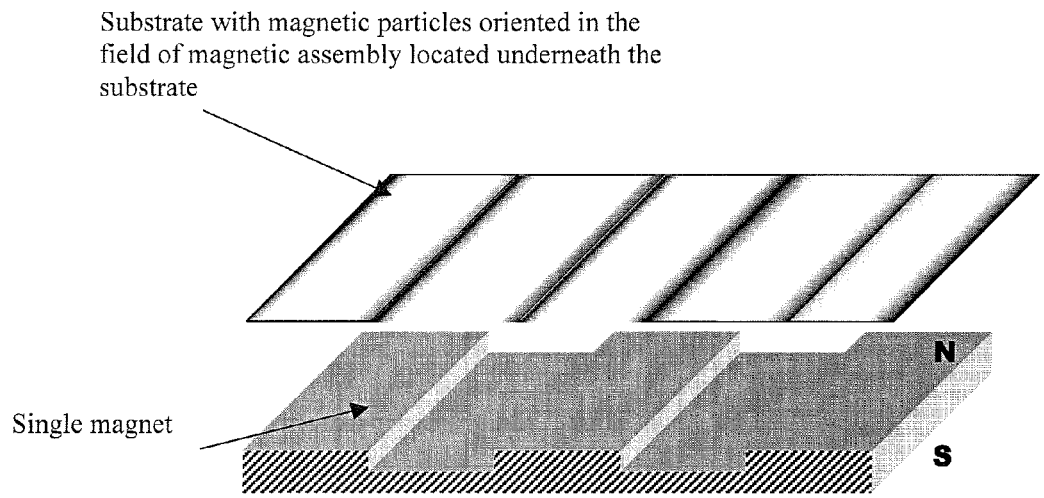
FIGS. 20b through 20d are perspective views of the magnetic arrangements shown in FIGS. 19b through 19d respectively.
Figure 20C:
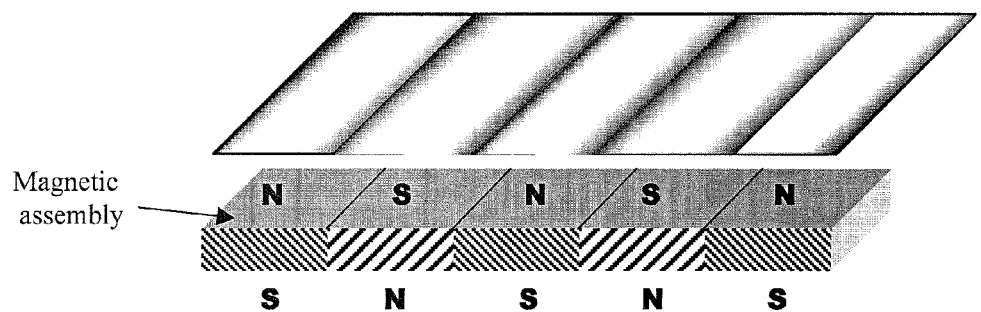
Figure 20D:
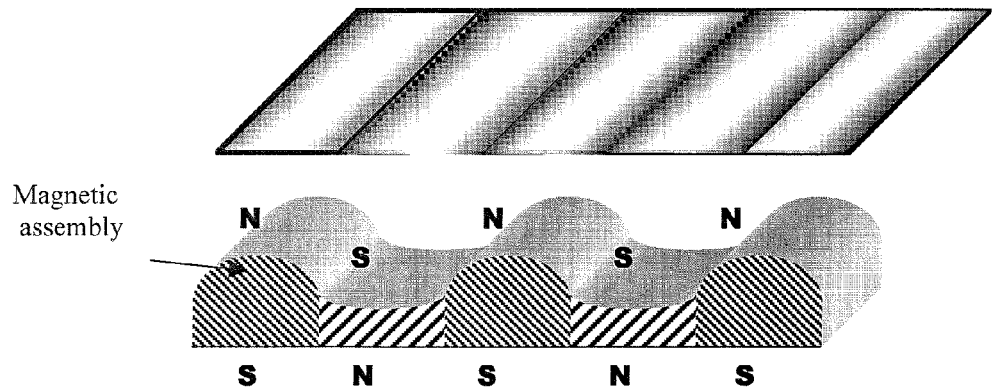

Regions 194 in FIG. 19e are metalized. Region 195 is transparent. Region 196 is a transparent hologram coated with high index material, whereby optically variable ink can be seen through this area. Regions 194 are metalized. The water shown in FIG. 19f is added to the image in FIG. 19e by printing magnetic ink in the field shown absent water under the bridge in FIG. 19e and applying the magnetic field generated from one of the aforementioned magnetic systems. Optically variable ink is also applied to the sky region of the image and is not magnetically oriented by a magnetic field; notwithstanding this region has a distinct color shift. It is interesting to note that the same optically variable ink applied to the water region and the sky region have very different visual effects. The water has an appearance of moving waves having a kinematic effect as the flakes are magnetically oriented and the sky has a color-shifting appearance with no kinematic effects; both the sky and water regions are preferably printed simultaneously.

The inventors of this invention have found that the presence of a hologram on the top or around a magnetically formed image generates a three-dimensionality to the image. In accordance with this invention the diffractive pattern serves as a frame of reference; that is, reference points relating to where things are with respect to one another. Illusive or virtual depth of the disclosed optical device depends on several constituent factors. The factors for the magnetically formed pattern include magnetic pigment color and brightness, thickness of the layer of the ink, sharpness of magnetically generated pattern, contrast ratio between the background and the magnetically generated pattern. Factors for the hologram include level of transmittance of the coated layer.

A diffractive pattern can be embossed in such a manner that it would be invisible at normal angle of observation allowing viewing of a magnetic print and become gradually highly visible at rotation of the print from 0° to 90° around the axis perpendicular to the surface of the diffractive embossing. A transparent blazed-patterned diffractive grating laminated to a magnetically formed image, is very good for this purpose.

Another significant advantage of using a transparent hologram is an increased capacity of information that can be placed into the optical device. A magnetically aligned image may form a pattern that would carry a particular amount of information or text and the transparent hologram laminated on the top of magnetic print would carry another amount of information or additional text. Both of these difference sources of information could overlap one another providing multiple information sources of different information covering a same viewing region, essentially increasing the information storing capacity of a same viewing region.

Various other embodiments may be envisaged without departing from the spirit and scope of the invention. For example, the light transmissive substrate can be coated with a high index layer, and coated with magnetically aligned pigment is any desired pattern and subsequently stamped with an embossed grating.

The bridge 191 in FIG. 19a is an image of an object capable of casting a shadow. When such an object is printed whereby the print is a fixed print and when magnetically aligned optically illusive pigment is applied near, under or beside the fixed image of the object, the illusive magnetically aligned pigment is perceived to be highly kinematic juxtaposed to the fixed print of the object.

What is claimed is:

1. A security device having a first region coated with magnetically aligned pigment particles; and, a second marked region different from the first region; wherein the magnetically aligned pigment particles form an image that appears to move with a change in viewing angle or incident light, and wherein the second marked region serves as a frame of reference against which the image appears to move.

2. A security device as defined in claim 1 wherein the second marked region is marked with indicia formed thereon by embossing or etching the second region to form a grating.

3. A security device as defined in claim 2, wherein the first region forms a layer of the security device and wherein the second region forms another layer of the security device.

4. A security device as defined in claim 3 wherein said another layer is a substrate layer.

5. A security device as defined in claim 1 wherein the second marked region has printed indicia thereon formed of material other than magnetically alignable pigment particles.

6. A security device as defined in claim 5, wherein the printed indicia is printed with ink or paint.

7. A security device as defined in claim 1, wherein the second marked region has a patterned segmented reflector layer.

8. A security device as defined in claim 1 wherein the magnetically aligned pigment particles form a color-shifting ink or paint.

9. A security device as defined in claim 1, wherein the first region is on one side of the substrate, and wherein the second marked region is on an opposite side of the substrate.

10. A security device comprising: a substrate; a first region coated with a magnetically aligned pigment and a second different region having a diffraction grating thereon, wherein the magnetically aligned pigment forms an image that appears to move with a change in viewing angle or angle of incident light, and wherein the diffraction grating serves as a frame of reference against which the image appears to move.

11. A security device as defined in claim 10, wherein the second region having the diffraction grating is segmented so that some sub regions are absent a the diffraction grating and other sub-regions include the diffraction grating.

12. A security device as defined in claim 10, wherein the first region is on one side of the substrate, and wherein the second different region is on an opposite side of the substrate.

13. A security device as defined in claim 10 wherein the diffraction grating has a high refractive index layer having a index of refraction of 1.65 or greater, adjacent to the diffraction grating.

14. A security device as defined in claim 10 where a reflective layer is coated upon portions of the diffraction grating.

15. A security device as defined in claim 10, further comprising a patterned segmented reflector layer, wherein at least some of the magnetically aligned pigment can be seen simultaneously with at least some of the patterned reflective layer.

16. A security device as defined in claim 10, wherein the diffraction grating serves as a frame of reference against which the image appears to move, and wherein the first region is contained within boundaries of the second region, or, wherein the second region is contained within boundaries of the first region, and wherein both the diffraction grating and the magnetically aligned pigment can be seen from one side of the device.

17. A security device as defined in claim 16 wherein one of the diffraction grating and the color-shifting coating have discontinuities therein defining windows wherein a portion of the grating or color-shifting coating is absent forming a diffraction grating pattern or a color-shifting coating pattern.

18. A security device as defined in claim 16 including a reflective layer or a high refractive index layer having an index of refraction of 1.61 or greater.

19. A security device as defined in claim 18, wherein the reflective layer or high index layer is patterned having windows therein where some of said layer is absent.

20. A security device as defined in claim 10, wherein the first region is on a first layer and wherein the second region is on a different layer.

21. A device as defined in claim 20 wherein the magnetically aligned pigment is a color switching pigment which changes color with angle of incident light.

22. A security device as defined in claim 10, wherein the first region is on one side of the substrate, and wherein the second different region is on a same side of the substrate.

* * * * *